United States Patent
Kumar et al.

(10) Patent No.: US 12,058,598 B2
(45) Date of Patent: Aug. 6, 2024

(54) WIRELESS EMERGENCY ALERT GEOFENCING ENHANCEMENTS

(71) Applicant: Apple Inc., Cupertino, CA (US)

(72) Inventors: Utkarsh Kumar, San Jose, CA (US); Kirk Allan Burroughs, Alamo, CA (US); Samuel J. Miller, San Jose, CA (US)

(73) Assignee: Apple Inc., Cupertino, CA (US)

( * ) Notice: Subject to any disclaimer, the term of this patent is extended or adjusted under 35 U.S.C. 154(b) by 47 days.

(21) Appl. No.: 17/579,357

(22) Filed: Jan. 19, 2022

(65) Prior Publication Data

US 2022/0377520 A1  Nov. 24, 2022

Related U.S. Application Data

(60) Provisional application No. 63/192,219, filed on May 24, 2021.

(51) Int. Cl.
*H04W 4/90* (2018.01)
*H04W 4/021* (2018.01)
*H04W 4/12* (2009.01)

(52) U.S. Cl.
CPC ............. *H04W 4/90* (2018.02); *H04W 4/021* (2013.01); *H04W 4/12* (2013.01)

(58) Field of Classification Search
CPC ......... H04W 4/90; H04W 4/021; H04W 4/12; H04W 4/02; H04W 4/029
See application file for complete search history.

(56) References Cited

U.S. PATENT DOCUMENTS 6,631,266 B1 * 10/2003 Lee .................. H04W 16/18
  455/448
8,200,183 B2 * 6/2012 Aftelak ............. H04W 76/50
  455/423

(Continued)

FOREIGN PATENT DOCUMENTS

EP   2790385 A1   10/2014
WO  2006135542 A2  12/2006
WO  2019160968 A1   8/2019

OTHER PUBLICATIONS

Partial European Search Report for EP Application No. 22169261.9 dated Aug. 23, 2022; 13 pgs.

(Continued)

*Primary Examiner* — Jean A Gelin
(74) *Attorney, Agent, or Firm* — FLETCHER YODER PC

(57) ABSTRACT

A base station receives an alert indicating a geofenced area, and determines whether its coverage area is completely within the area. If so, the base station generates/sends a wireless emergency alert (WEA) to user equipment in the coverage area that does not indicate the area. Otherwise, the base station generates/sends a WEA that indicates the area. The base station sends action messages that indicate a periodicity and end time for the user equipment to determine whether its location is within the geofenced area, a lack of service time limit and lack of service action for the user equipment to perform after it has been without cellular service for the lack of service time limit, a lack of location time limit and lack of location action for the user equipment to perform if its location cannot be determined for the lack of location time limit, and/or that the WEA has ended.

20 Claims, 10 Drawing Sheets

(56) References Cited

U.S. PATENT DOCUMENTS

| | | | |
|---|---|---|---|
| 8,300,560 B2* | 10/2012 | Nowlan | H04W 4/90 |
| | | | 455/404.1 |
| 8,676,153 B2 | 3/2014 | Sennett | |
| 10,225,803 B1* | 3/2019 | Nagarajan | H04W 52/0261 |
| 11,184,734 B1 | 11/2021 | Carraway | |
| 2006/0030333 A1* | 2/2006 | Ward | H04W 64/003 |
| | | | 455/456.1 |
| 2008/0085699 A1* | 4/2008 | Hirano | H04W 24/02 |
| | | | 455/414.2 |
| 2009/0227224 A1* | 9/2009 | Aftelak | H04W 76/50 |
| | | | 455/404.2 |
| 2009/0291630 A1 | 11/2009 | Dunn | |
| 2012/0309376 A1* | 12/2012 | Huang | G01S 5/02526 |
| | | | 455/418 |
| 2014/0088965 A1* | 3/2014 | Goel | G10L 17/08 |
| | | | 704/E17.001 |
| 2015/0111524 A1* | 4/2015 | South | G08B 27/001 |
| | | | 455/404.2 |
| 2015/0147995 A1* | 5/2015 | Bontu | H04W 4/02 |
| | | | 455/404.1 |
| 2016/0012712 A1* | 1/2016 | Mattiaccio, III | G08B 25/016 |
| | | | 340/539.11 |
| 2016/0255668 A1* | 9/2016 | Wei | H04W 8/005 |
| | | | 455/434 |
| 2016/0309400 A1* | 10/2016 | Swaminathan | H04W 84/02 |
| 2017/0019761 A1* | 1/2017 | Heo | H04W 4/021 |
| 2017/0094490 A1* | 3/2017 | Ryan | H04W 4/90 |
| 2018/0160267 A1* | 6/2018 | Immendorf | H04W 4/021 |
| 2018/0262903 A1* | 9/2018 | Ryan | H04W 4/90 |
| 2019/0246260 A1* | 8/2019 | Edge | H04W 4/029 |
| 2019/0327787 A1* | 10/2019 | Musgrove | H04W 76/50 |
| 2020/0252780 A1* | 8/2020 | McClendon, IV | H04W 4/90 |
| 2021/0092796 A1 | 3/2021 | Kumar et al. | |
| 2022/0167121 A1* | 5/2022 | Vassilyev | H04W 4/029 |
| 2022/0245292 A1* | 8/2022 | Merjanian | G06T 19/006 |

OTHER PUBLICATIONS

ATIS WEA 3.0 Webinar; Delivering Targeted Alerts—Advancing the Wireless Emergency Alerts System; Jun. 26, 2019.
Partial European Search Report for EP Application No. 23181749 dated Aug. 9, 2023; 17 pgs.

* cited by examiner

| BITS | DESCRIPTION |
|---|---|
| 8765 | |
| 0001 | ACTIVE ALERT IDENTITY TUPLE LIST |
| 0010 | ACTIVE ALERT IDENTITY TUPLE LIST- COMMON WARNING AREA COORDINATES |
| 0011 | CONFIG ACTION - PERIODICITY CONFIG |
| 0100 | CONFIG ACTION - ALERT END INDICATION |
| 0101 | CONFIG ACTION - LACK OF SERVICE |
| 1110 | CONFIG ACTION - LACK OF LOCATION |
| 1111 | CMSP DEFINED USE |

*FIG. 6*

| 8 | 7 | 6 | 5 | 4 | 3 | 2 | 1 |
|---|---|---|---|---|---|---|---|
| 0 | 0 | 1 | 1 | LENGTH | | | |
| LENGTH | | | 0 | 0 | 0 | 0 | 0 |
| WEA IDENTIFIER | | | | | | | |
| PERIODICITY | | | | | | | |
| END TIME | | | | | | | |

*FIG. 7*

WIRELESS EMERGENCY ALERT GEOFENCING ENHANCEMENTS

CROSS-REFERENCE TO RELATED APPLICATIONS

This application claims priority to U.S. Provisional Application No. 63/192,219, filed May 24, 2021, entitled "WIRELESS EMERGENCY ALERT GEOFENCING ENHANCEMENTS," the disclosure of which is incorporated by reference in its entirety for all purposes.

BACKGROUND

The present disclosure relates generally to wireless emergency alerts, and more specifically to transmitting wireless emergency alerts to user equipment in or around a targeted geographical area.

A wireless emergency alert (WEA) is an alert defined by the Alliance for Telecommunications Industry Solutions (ATIS) sent to wireless mobile devices (e.g., cell phones, pagers, and so on) via a 3rd Generation Partnership Project (3GPP) network (e.g., a $4^{th}$ generation (4G) cellular network, a $5^{th}$ generation (5G) cellular network, and so on). A WEA may include, for example, presidential alerts, imminent threat alerts, child abduction emergency or AMBER (America's Missing: Broadcast Emergency Response) alerts, public safety alerts, and the like. The WEA may be sent by a Commercial Mobile Alert System (CMAS). Some WEAs, such as those conforming to the ATIS WEA 3.0 standard, may indicate a geofenced area (e.g., where the WEAs are relevant or applicable). User equipment receiving the WEA may determine whether the user equipment is located within the geofenced area, and, if so, display or otherwise output the WEA. However, in certain circumstances, determining whether the user equipment is located within the geofenced area may be inefficient, or even unnecessary. Moreover, there may be difficulties for user equipment that are located outside the geofenced area when receiving the WEA, but later enter the geofenced area.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a base station having a receiver, a transmitter, and at least one processor. The at least one processor receives, via the receiver, an alert message from an alert originator. The alert message includes an indication of a geofenced area. The at least one processor also determines whether a coverage area of the base station is within the geofenced area, and, in response to determining that the coverage area is completely within the geofenced area, sends, using the transmitter, a first wireless emergency alert without the indication of the geofenced area to user equipment in the coverage area. The at least one processor further, in response to determining that the coverage area is not completely within the geofenced area, sends, using the transmitter, a second wireless emergency alert comprising the indication of the geofenced area to the user equipment in the coverage area.

In another embodiment, a method performed by user equipment includes receiving, via a receiver of the user equipment, a wireless emergency alert to determine whether the user equipment is within a geofenced area. The method also includes, after determining that the user equipment is not within the geofenced area in response to receiving the wireless emergency alert, receiving, via the receiver of the user equipment, one or more action messages to determine whether the user equipment is within the geofenced area. The one or more action messages have a periodicity and an end time. The method further includes, after determining that the user equipment is not within the geofenced area in response to receiving the one or more action messages, determining that the end time has not elapsed. The method includes, in response to determining that the end time has not elapsed, determining that the periodicity has elapsed, and, in response to determining that the periodicity has elapsed, determining that the user equipment is within the geofenced area. The method also includes, in response to determining that the end time has elapsed, ending processing of the wireless emergency alert.

In yet another embodiment, a non-transitory computer-readable medium stores computer-executable instructions that, when executed by one or more processors of user equipment, cause the one or more processors to receive, via a receiver of the user equipment, a wireless emergency alert to determine whether the user equipment is within a geofenced area, and, in response to determining that the user equipment is within the geofenced area, display the wireless emergency alert. The instructions also cause the one or more processors to, after determining that the user equipment is not within the geofenced area in response to receiving the wireless emergency alert, receive, via the receiver of the user equipment, one or more action messages comprising an indication to end the wireless emergency alert. The instructions further cause the one or more processors to, in response to receiving the one or more action messages, end processing of the wireless emergency alert.

In another embodiment, a method performed by user equipment includes receiving, via a receiver of the user equipment, a wireless emergency alert to determine whether the user equipment is within a geofenced area, and, after determining that the user equipment is not within the geofenced area in response to receiving the wireless emergency alert, receiving, via the receiver of the user equipment, one or more action messages to determine whether the user equipment is within the geofenced area. The one or more action messages have a lack of service time limit and a lack of service action. The method also includes, after determining that the user equipment is not within the geofenced area in response to receiving the one or more action messages, determining that the user equipment does not have cellular service, and, in response to determining that the user equipment does not have cellular service, determining that the lack of service time limit has elapsed. The method further includes, in response to determining that the lack of service time limit has elapsed, performing the lack of service action.

In yet another embodiment, a non-transitory computer-readable medium stores computer-executable instructions that, when executed by one or more processors of user equipment, cause the one or more processors to receive, via a receiver of the user equipment, a wireless emergency alert to determine whether the user equipment is within a geofenced area, and, after determining that the user equipment is not within the geofenced area in response to receiving the wireless emergency alert, receive, via the receiver of the user equipment, one or more action messages to determine whether the user equipment is within the geofenced area. The one or more action messages has a lack of location time limit and a lack of location action. The instructions also cause the one or more processors to, after determining that the user equipment is not within the geofenced area in response to receiving the one or more action messages, determine whether a location of the user equipment can be determined, and, in response to determining that the location of the user equipment cannot be determined, determine whether the lack of location time limit has elapsed. The instructions further cause the one or more processors to, in response to determining that the lack of location time limit has elapsed, perform the lack of location action.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 6 is an example list of extended WEA Handset Action Message (WHAM) signaling, according to embodiments of the present disclosure;

FIG. 7 is a tag-length-value (TLV) code for indicating a periodicity configuration for determining whether a location of user equipment is within a geofenced area, according to embodiments of the present disclosure;

DETAILED DESCRIPTION OF SPECIFIC EMBODIMENTS

Figure 1:
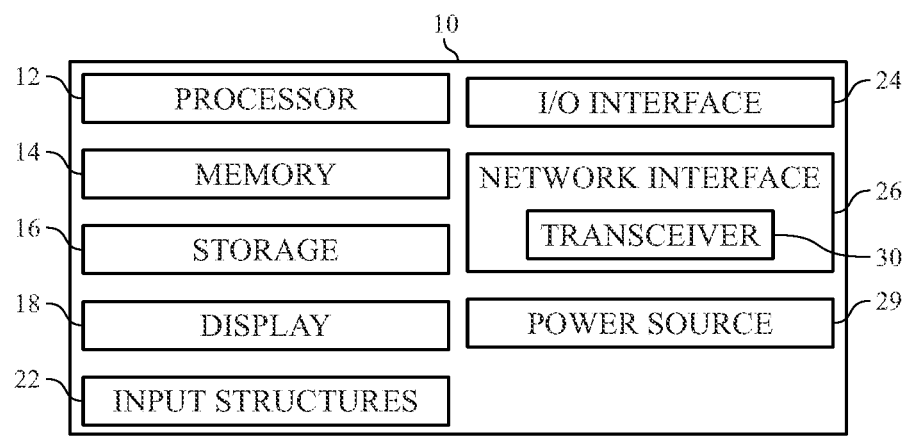
FIG. 1 is a block diagram of an electronic device (e.g., user equipment), according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

This disclosure is directed to wireless emergency alerts (WEAs), which, when conforming to the Alliance for Telecommunications Industry Solutions (ATIS) WEA 3.0 standard, may indicate a geofenced area. In particular, the WEA may be sent via a base station supporting a 3rd Generation Partnership Project (3GPP) network (e.g., a $4^{th}$ generation (4G) cellular network, a $5^{th}$ generation (5G) cellular network, and so on) to user equipment in a coverage area of the base station. The user equipment receiving the WEA may determine whether the user equipment is located within the geofenced area, and, if so, display or otherwise output the WEA. However, if, for example, the coverage area is completely within the geofenced area, then it may be unnecessary, and thus an inefficient use of processing and/or network resources, for the user equipment to determine whether it is located within the geofenced area.

Moreover, there may be difficulties for user equipment that are located outside the geofenced area when receiving the WEA, but later enter the geofenced area. In particular, despite the network being configured to periodically resend WEAs, it is assumed (as may be defined by ATIS) that the user equipment will only determine if it is located within the geofenced area once. For user equipment that received the WEA when outside the geofenced area (and as such, did not output the WEA), the network may periodically broadcast a WEA Handset Action Message (WHAM) indicative of the WEA that requests that the user equipment re-determine whether it is located within the geofenced area. In some embodiments, the user equipment may not rely on WHAM exclusively to trigger geofencing. For example, the user equipment may have its own criteria (e.g., such as time-based criteria or timers) that, if met, may cause the user equipment to re-determine whether it is located within the geofenced area. In either case, the WHAM and/or the WEA may be used as an indicator of whether or not a given alert is active. If the user equipment enters the geofenced area, but loses cellular service, or it loses cellular service and enters geofenced area, it may not receive a WHAM and/or a WEA, and thus not display or otherwise output the WEA, despite being in the geofenced area where a user should know about the WEA. In the above mentioned scenario, even if the user equipment were to trigger a location check on its own, the user equipment may fail to determine its location (e.g., because signals enabling location determination, such as global navigation satellite system (GNSS) service or the Global Positioning System (GPS) service, are not received or observable), and thus not display or otherwise output the WEA, despite being in the geofenced area where a user should know about the WEA.

Additionally, when an alert associated with a WEA ends, the network simply stops resending the periodic WEAs and WHAMs associated with the alert. However, if the user equipment is located outside or some distance away from the geofenced area when receiving the WEA, and the alert ends, but the user equipment later enters the geofenced area after the alert has ended, the user equipment may continue storing the WEA expecting a corresponding WHAM, and, in some cases, may continue determining to see if it is located in the geofenced area indicated by the WEA. This may unnecessarily expend processing and/or networking resources, and sometimes result in a WEA to be output well after the alert associated with the WEA has ended.

Accordingly, embodiments herein provide systems and techniques that enable a base station of a network receiving an alert message indicating a geofenced area to determine whether an area covered by the base station is completely within the geofenced area. If so, then there may be no need for user equipment within the coverage area to determine whether it is located within the geofenced area, since the coverage area of the base station that is completely within the geofenced area. As such, the base station may generate and send a WEA based on the alert message that does not indicate the geofenced area to the user equipment in its coverage area, or, in some embodiments, the base station may indicate to the user equipment in its coverage area that geofencing is not required to be performed (e.g., using an additional flag). If the base station determines that its coverage area is not completely within the geofenced area (e.g., at least some of its coverage area is outside the geofenced area), then the base station may generate and send a WEA to the user equipment based on the alert message that indicates the geofenced area. In this manner, the user equipment in coverage areas that are completely located within the geofenced area may avoid using processing and/or networking resources to unnecessarily determine whether the user equipment is located within the geofenced area.

The disclosed embodiments also enable signaling (e.g., in WHAMs) a periodicity for user equipment to determine whether its location is within a geofenced area indicated in a corresponding WEA. As such, if the user equipment enters the geofenced area and loses cellular service, but still retains GNSS/GPS service or has other means to determine its location (e.g., WiFi), then it may determine to see if it is in the geofenced area, and display the WEA. The signaling may also include an end time for the user equipment to determine whether its location is within the geofenced area, such that the user equipment may stop wasting processing and/or networking resources to determine whether its location is within the geofenced area after the end time. The signaling may further include a WEA identifier to enable identification of the WEA for which the periodicity and the end time correspond.

The disclosed embodiments further enable signaling (e.g., in WHAMs) a lack of service time limit and a lack of service action for the user equipment to perform after it has been without cellular service for the lack of service time limit. As such, if the user equipment enters the geofenced area and loses cellular service, and does not regain cellular service within the lack of service time limit (or any other suitable criteria that may be used to determine that the user equipment is without cellular service), then the user equipment may perform the lack of service action. The lack of service action may include displaying or otherwise outputting the WEA, or any other suitable action programmed into the user equipment. The signaling may also include a WEA identifier to enable identification of the WEA for which the lack of service time limit and the lack of service action correspond. In this manner, the user equipment may display the WEA, or perform any other suitable action, even if it is without cellular service.

Similarly, the disclosed embodiments enable signaling (e.g., in WHAMs) a lack of location time limit and a lack of location action for the user equipment to perform if the user equipment cannot determine its location for the lack of location time limit. As such, if the user equipment enters the geofenced area and is without cellular service and/or cannot determine its location, and does not regain its location determination service within the lack of location time limit, then the user equipment may perform the lack of location action. The lack of location action may include displaying or otherwise outputting the WEA, or any other suitable action programmed into the user equipment. The signaling may also include a WEA identifier to enable identification of the WEA for which the lack of location time limit and the lack of location action correspond. In this manner, the user equipment may display the WEA, or perform any other suitable action, even if it cannot determine its location.

The disclosed embodiments may also enable signaling (e.g., in WHAMs) an alert end indication that indicates that the alert associated with the corresponding WEA has ended. That is, instead of the network simply stopping to resend the periodic WEAs and WHAMs associated with the alert, the network may send the alert end indication to indicate that the alert has ended. As such, the user equipment may avoid continued storage of a WEA and performing geofencing-related actions corresponding to the alert in expectation of a corresponding WHAM, and continued determinations to see if it is located in the geofenced area indicated by the WEA. The signaling may also include a WEA identifier to enable identification of the WEA for which the alert end indication corresponds. Thus, user equipment-side processing and/or networking resources may be conserved, and outputting a WEA well after the alert associated with the WEA has ended may be avoided.

With the preceding in mind, FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein and below.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus include a transmitter and a receiver. The power source 29 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device.

Figure 2:
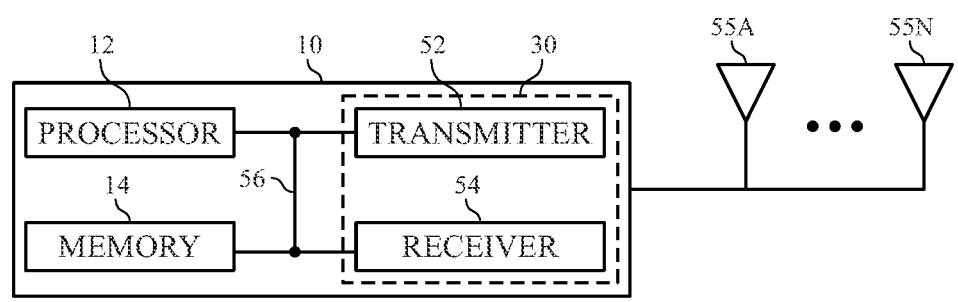
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or the antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards.

The transmitter 52 may wirelessly transmit packets having different packet types or functions. For example, the transmitter 52 may transmit packets of different types generated by the processor 12. The receiver 54 may wirelessly receive packets having different packet types. In some examples, the receiver 54 may detect a type of a packet used and process the packet accordingly. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
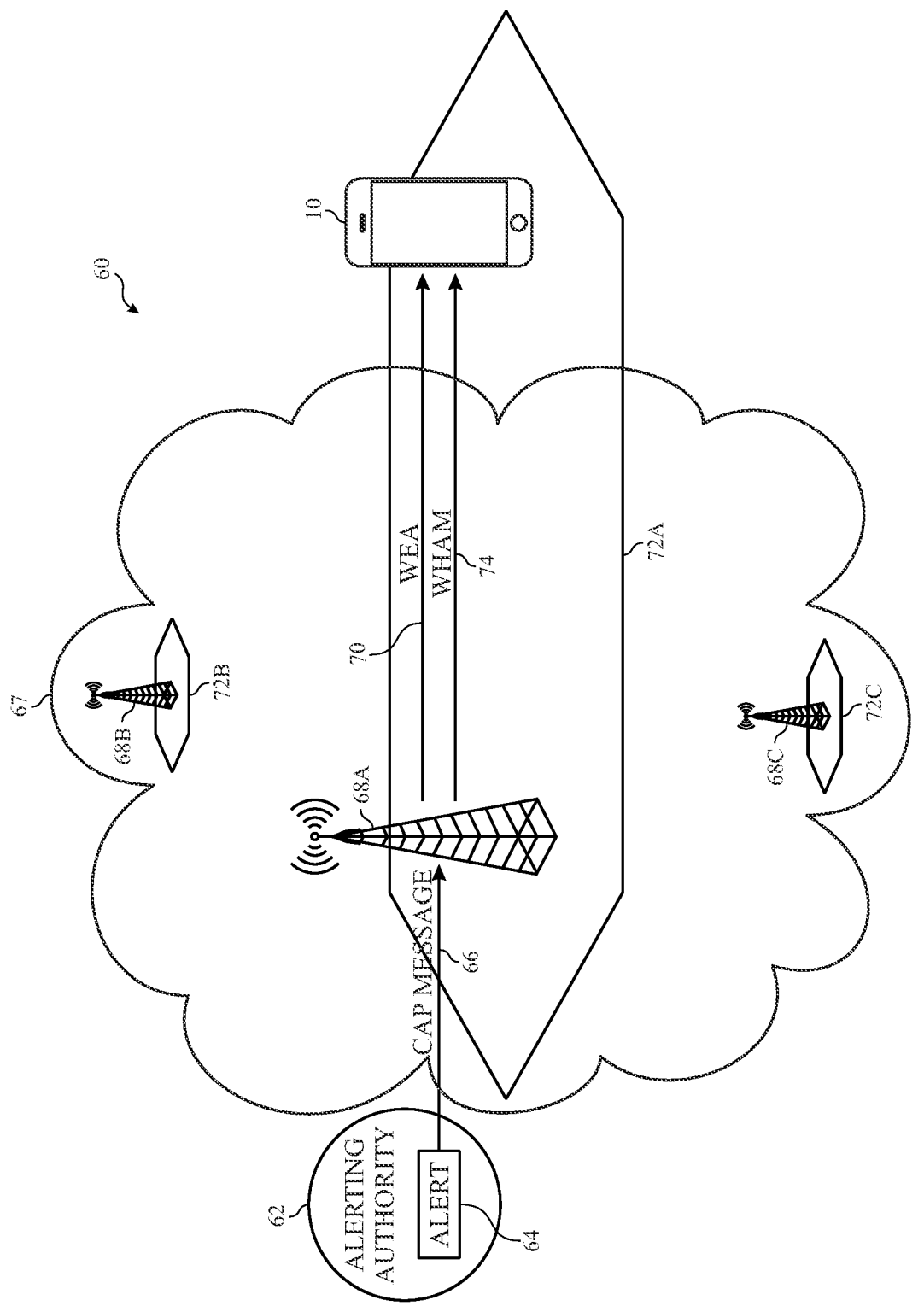
FIG. 3 is a schematic diagram of a communication system that may send wireless emergency alerts (WEAs) to the electronic device of FIG. 1, according to embodiments of the present disclosure.

FIG. 3 is a schematic diagram of a communication system 60 that may send wireless emergency alerts (WEAs) to the electronic device 10 of FIG. 1, according to embodiments of the present disclosure. An alerting authority computing device 62 (referred to herein as an alerting authority) may generate an alert 64. The alerting authority 62 may include one or more computing devices of a jurisdiction with the designated authority to alert or warn the public (e.g., at least people within a geographical region or geofenced area), and include at least some of the components of the electronic device 10 shown in FIGS. 1 and/or 2. The alerting authority 62 may be one of over 1500 federal, state, local, tribal, and territorial authorities, such as weather authorities (e.g., the National Oceanic and Atmospheric Administration's (NOAA) National Weather Service (NWS)), missing persons' authorities (e.g., the National Center for Missing and Exploited Children), county authorities (e.g., the Pennsylvania Delaware Country authority), city authorities (e.g., the Texas City of Houston authority), emergency management authorities (e.g., the Michigan City of Lansing Emergency Management authority), public safety authorities (e.g., the North Carolina Department of Public Safety authority), law enforcement authorities (e.g., the Illinois State Police authority), homeland security authorities (e.g., the Wyoming Office of Homeland Security authority), and so on. In some embodiments, an alert originator (e.g., an individual person operating the alerting authority 62) employed by the alerting authority 62 may generate the alert 64. The alert 64 may be related to an impending natural or manmade disaster, threat, or dangerous or missing person. For example, the alert 64 may include a presidential alert, imminent threat alert, child abduction emergency or AMBER (America's Missing: Broadcast Emergency Response) alert, and so on.

The alerting authority 62 may generate a Common Alerting Protocol (CAP) message 66 based on the alert 64, which may include an indication of the alert 64, as well as other characteristics of the alert 64, such as a geofenced area (e.g., latitude and longitude coordinates of a geofence in the form of a shape or polygon) for which the alert 64 is relevant, a duration of time for which the alert 64 is relevant, and so on. The CAP message 66 may be in the form of an international standard, and routed through the Federal Emergency Management Agency's (FEMA's) Integrated Public Alert and Warning System (IPAWS) to communication networks 67 provided by wireless (e.g., cellular) network providers having base stations within a relevant area of the alert 64 (e.g., based on the geofenced area defined in the CAP message 66, based on a defined radius from a defined point, using Federal Information Processing Standard (FIPS/county) codes, and so on). Accordingly, a base station 68A-C (collectively referred to as 68) may receive the illustrated CAP message 66. The base station 68 may include at least some of the components of the electronic device 10 shown in FIGS. 1 and/or 2. Moreover, it should be understood that the base station 68 is considered part of the network 67.

Upon receiving the CAP message 66, the base station 68 may generate a WEA 70 based on the CAP message 66 that indicates the alert 64. In some embodiments, the base station 68 may include a receiver (in the form of the receiver 54 as described above with respect to the electronic device 10), and receive the CAP message 66 using the receiver. Additionally or alternatively, the base station 68 may receive the CAP message 66 over wired network-side cables (e.g., fiber cables). The WEA 70, if conforming to the Alliance for Telecommunications Industry Solutions (ATIS) WEA 3.0 standard, may indicate the geofenced area. The base station 68 may then send the WEA 70 to user equipment (e.g., the electronic device 10) within its coverage area 72A-C (e.g., an area or cell for which the base station 68 provides network coverage, collectively referred to as 72). The base station 68 may provide any suitable network coverage, such as coverage for a 3rd Generation Partnership Project (3GPP) network (e.g., a $4^{th}$ generation (4G) cellular network, a $5^{th}$ generation (5G) cellular network, and so on). The network provider may cause the base station 68 to repeatedly send the WEA 70 to the user equipment 10 at a certain periodicity (e.g., between the range of every 1 second to every 24 hours, such as every 3 to 4 seconds, every 10-15 seconds, and so on). It should be noted that, even though the ATIS WEA standard, CAP messages 66, and 3GPP are referred to herein, these are merely example technologies for which the disclosed embodiments may apply. In additional or alternative embodiments, the systems and techniques disclosed herein may apply to other messaging and/or network technologies for example, regions outside of the United States, such as Canada, Europe and the European Telecommunications Standards Institute (ETSI), and so on.

Upon receipt of the WEA 70, the user equipment 10 may determine (using a device-specific location determination technique and/or a global navigation satellite system (GNSS) service, such as the Global Positioning System (GPS) service) whether it is located in the geofenced area (e.g., performing device-based geofencing (DBGF)). Despite the network 67 or the network provider configured to periodically resend the WEA 70 via the base station 68, it is assumed (as defined by ATIS) that the user equipment 10 may only determine if it is located within the geofenced area one time. In particular, each WEA 70 may have an identifier or serial number that enables the user equipment 10 to perform duplication detection and not present the WEA 70 more than once. Because the user equipment 10 may receive the WEA 70 when located outside the geofenced area (and as such, may not output the WEA 70 at that time), the network 67 or the network provider may cause the base station 68 to also periodically broadcast a WEA Handset Action Message (WHAM) 74 indicative of the WEA 70 that requests that the user equipment 10 re-determine whether it is located within the geofenced area. Like the WEA 70, the periodicity of the WHAM 74 may include a range between every 1 second to every 24 hours, such as every 3 to 4 seconds, every 10-15 seconds, and so on. Also like the WEA 70, the WHAM 74 may include an identifier or serial number to enable the user equipment to perform duplicate detection so as to cause the user equipment 10 to again determine whether it is located in the geofenced area.

Figure 4:
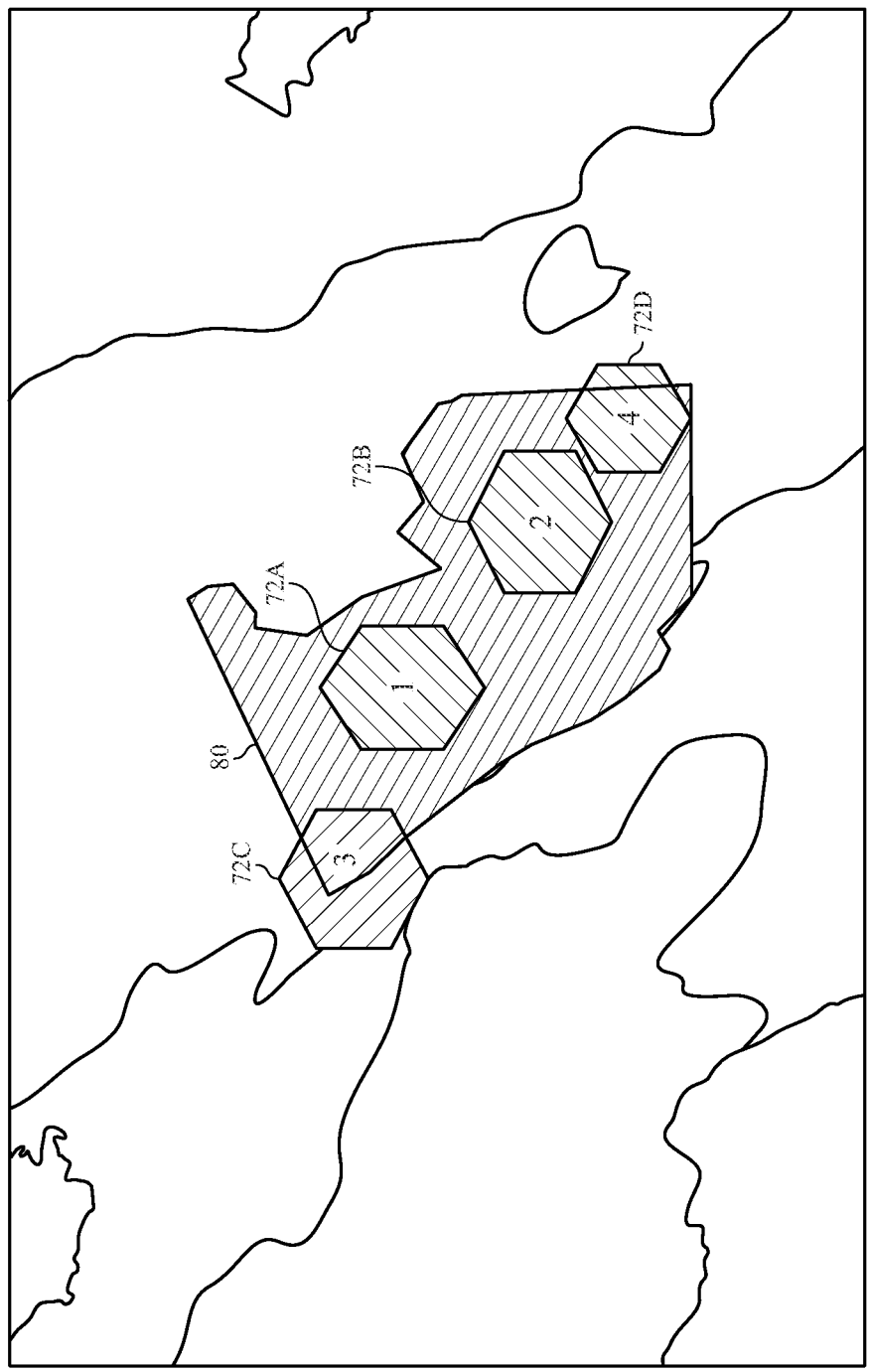
FIG. 4 is a map illustrating a geofenced area as indicated by a WEA, according to embodiments of the present disclosure.

However, if, for example, the coverage area 72 is completely within the geofenced area, then it may be unnecessary, and thus an inefficient use of processing and/or network resources, for the user equipment 10 to determine whether it is located within the geofenced area. In particular, as geofencing becomes more common, more alerts 64 (e.g., public safety alerts, AMBER alerts, wildfire alerts, and the like) are broadcasted with geofencing parameters. In some cases, WEAs 70 may be broadcast to geofenced areas 80 that include entire counties, and even multiple cities. In such cases, coverage areas 72 (especially in the case of small or home cells, mmWave NR implementations, or multiple-input and multiple-output (MIMO)-based cellular implementations) may be much smaller than the geofenced area 80. FIG. 4 is a map illustrating a geofenced area 80 (e.g., an alert area) as indicated by a WEA 70, according to embodiments of the present disclosure. The map also illustrates four coverage areas 72A-D, which may be provided by four base stations 68. Coverage areas 72A and 72B are completely within the geofenced area 80 (e.g., no portion of the coverage areas 72A and 72B are outside the geofenced area 80), while coverage areas 72C and 72D are partially within the geofenced area 80 and partially outside the geofenced area 80.

Accordingly, if, for example, the user equipment 10 is initially outside the geofenced area 80 (e.g., located in a portion of coverage area 72C that is outside the geofenced area 80) when it receives the WEA 70, then the user equipment 10 may compare its location to the geofenced area 80 indicated in the WEA 7.0, determine that it is not located in the geofenced area 80, and not output the WEA 70. The user equipment 10 may receive periodic WEAs 70, but because, as defined by ATIS, the user equipment 10 may only determine whether it is located within the geofenced area 80 one time, it may no longer determine whether it is located within the geofenced area 80 in response to receiving subsequent WEAs 70. Instead, the user equipment 10 may receive WHAMs 74 requesting that the user equipment 10 determine whether it is located within the geofenced area 80 indicated by the WEA 70.

However, if the user equipment 10 has not determined whether it is located within the geofenced area 80, and then proceeds to a coverage area (e.g., 72A) that is completely within the geofenced area 80, then there is no need for the user equipment 10 to determine whether it is located within the geofenced area 80, as the entire coverage area 72A is within the geofenced area 80. Accordingly, the disclosed embodiments enable the base station 68 of a coverage area 72A that is completely within the geofenced area 80 to send a WEA 70 to the user equipment 10 that does not indicate the geofenced area 80, such that the user equipment 10 may avoid processing the geofenced area 80 to unnecessarily determine whether it is located in the geofenced area 80. If the base station 68 determines that its coverage area (e.g., 72C) is not completely within the geofenced area, then the base station 68 may generate and send a WEA 70 to the user equipment 10 that indicates the geofenced area 80. In this manner, the user equipment 10 in coverage areas (e.g., 72A) that are completely located within the geofenced area 80 may avoid using processing and/or networking resources to unnecessarily determine whether the user equipment 10 is located within the geofenced area 80.

Figure 5:
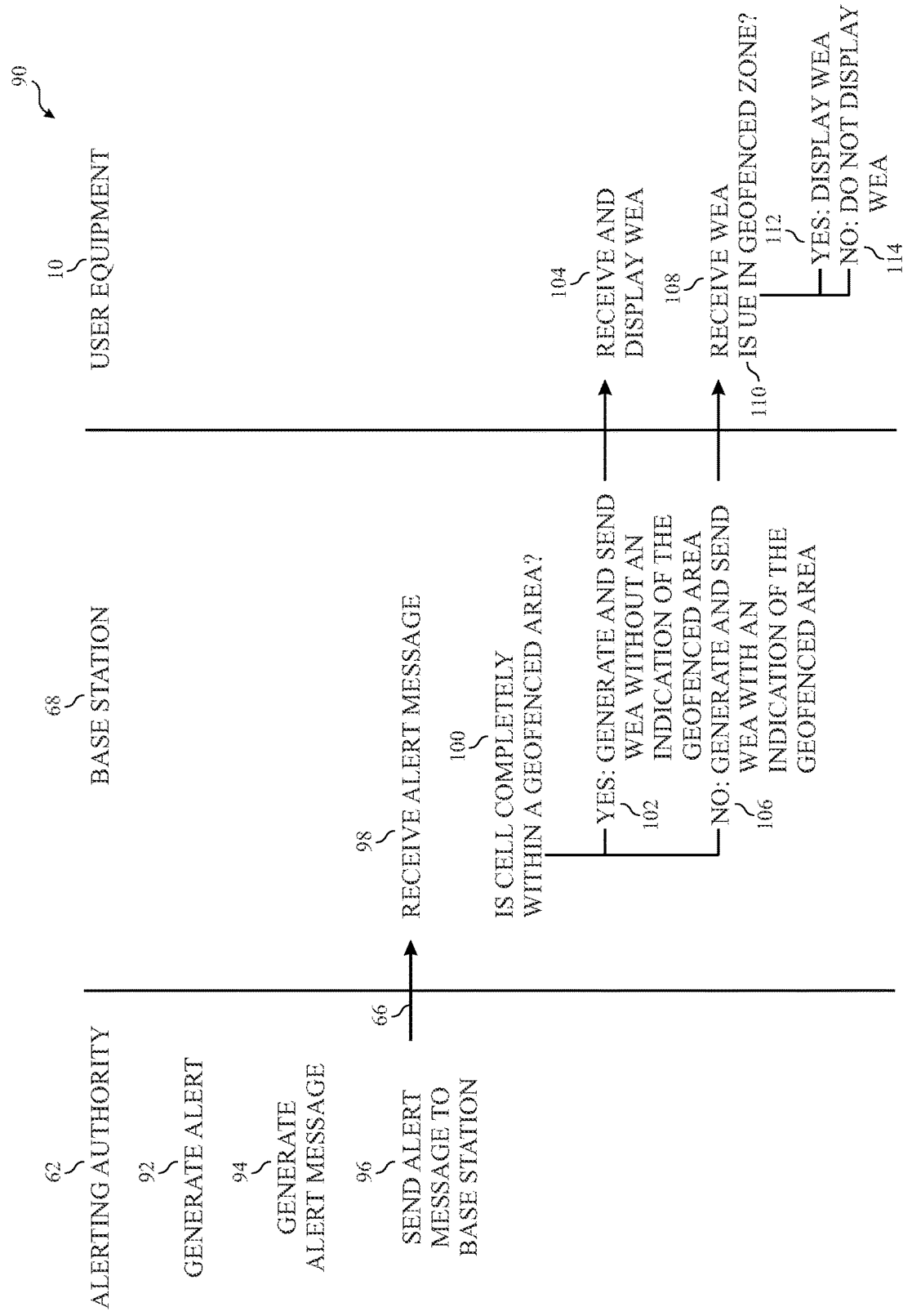
FIG. 5 is a flowchart of a method for sending selectively sending WEAs to user equipment that indicate or do not indicate a geofenced area based on whether a coverage area is completely within the geofenced area, according to embodiments of the present disclosure.

FIG. 5 is a flowchart of a method 90 for sending selectively sending WEAs 70 to user equipment 10 that indicate or do not indicate a geofenced area 80 based on whether a coverage area 72 is completely within the geofenced area 80, according to embodiments of the present disclosure. Any suitable device (e.g., a controller) that may control components of the alerting authority 62, the network 67, the base station 68, and/or the user equipment 10, such as the processor 12, may perform the method 90. In some embodiments, the method 90 may be implemented by executing instructions stored in a tangible, non-transitory, computer-readable medium, such as the memory 14 or storage 16, using the processor 12. For example, the method 90 may be performed at least in part by one or more software components, such as an operating system, one or more software applications, and the like, of the alerting authority 62, the base station 68, and/or the user equipment 10. While the method 90 is described using steps in a specific sequence, it should be understood that the present disclosure contemplates that the described steps may be performed in different sequences than the sequence illustrated, and certain described steps may be skipped or not performed altogether.

In process block 92, the alerting authority 62 generates an alert 64. The alert 64 may be related to an impending natural or manmade disaster, threat, or dangerous or missing person. In process block 94, the alerting authority 62 generates an alert message 66 based on the alert 64. The alert message 66 may be in the form of a Common Alerting Protocol (CAP) message, and may include an indication of the alert 64, as well as other characteristics of the alert 64, such as a geofenced area 80 for which the alert 64 is relevant, a duration of time for which the alert 64 is relevant, and so on.

In process block 96, the alerting authority 62 sends the alert message 66 to the base station 68. In particular, the alert message 66 may be routed through FEMA's IPAWS to the base station 68 of a network 67 or the network provider located within a relevant area of the alert 64. The alerting authority 62 may send the alert message to the base station 68 based on the geofenced area 80 defined in the alert message 66, based on a defined radius from a defined point, using Federal Information Processing Standard (FIPS/county) codes, and so on.

In process block 98, the base station 68 receives the alert message 66, and, in decision block 100, determines whether a cell or coverage area 72 supported by the base station 68 is completely within the geofenced area 80. In particular, the base station 68 may store an indication of its coverage area 72 (e.g., a radius from the base station 68, latitude and longitude coordinates, and so on), and compare the indication of the coverage area 72 to the geofenced area 80 indicated in the alert message 66. If the base station 68 determines that its coverage area 72 is completely within the geofenced area 80, then the base station 68, in process block 102, generates and sends (e.g., broadcasts) a WEA 70 without an indication of the geofenced area 80 to user equipment 10 in the coverage area 72. Additionally, in some embodiments, the network 67 may determine to generate and send the WEA 70 via base stations 68 that have coverage areas 72 that only slightly extend outside the geofenced area 80 (e.g., less than 50%, 30%, 25%, 20%, 15%, 10%, 8%, 7%, 5%, 3%, 2%, 1%, and so on, of the coverage area 72 extending outside the geofenced area 80) in order to conserve network resources. That is, the base station 68 may generate the WEA 70 to indicate the alert 64, but not indicate the geofenced area 80, since the user equipment 10 is in a coverage area 72 that is completely within the geofenced area 80, and thus has no need to determine whether it is in the geofenced area 80. In some embodiments, the WEA 70 that does not have the indication of the geofenced area 80 may conform of the ATIS WEA 2.0 standard, which does not include an indication of the geofenced area 80. This may decrease processing usage of the base station 68 to prepare the WEA 70 to include the coordinates of the geofenced area 80.

In process block 104, the user equipment 10 receives and displays (or otherwise outputs) the WEA 70. As referred to herein, display or otherwise outputting the WEA 70 includes displaying or otherwise outputting an indication of the alert 64 corresponding to the WEA 70. For example, the user equipment 10 may display an indication of the alert 64 on the display 18. In some embodiments, the user equipment 10 may output the alert 64 using additional or alternative devices, such as by outputting the alert 64 as audio data via speakers of the user equipment 10, as haptic data by vibrating the user equipment 10 via a motor of the user equipment 10, and so on. This may decrease processing and network usage by the user equipment 10 (e.g., for determining its location using a device-specific location determination technique and/or a GNSS or GPS service, comparing its location to the geofenced area 80, and so on).

If the base station 68 determines that its coverage area 72 is not completely within the geofenced area 80, then the base station 68, in process block 106, generates and sends (e.g., broadcasts) a WEA 70 with an indication of the geofenced area 80 to user equipment 10 in the coverage area 72. That is, the base station 68 may generate the WEA 70 to indicate the alert 64, along with latitude and longitude coordinates of the geofenced area 80 to the user equipment 10. In some embodiments, the WEA 70 that includes the indication of the geofenced area 80 may conform of the ATIS WEA 3.0 standard, which provides an indication of the geofenced area 80.

In process block 108, the user equipment 10 receives the WEA 70. In decision block 110, the user equipment 10 determines whether it is located within the geofenced area 80 indicated in the WEA 70. In particular, the user equipment 10 may use a device-specific location determination technique and/or a GNSS or GPS service to determine its location, and compare its location to the geofenced area 80. If the user equipment 10 determines that it is located within the geofenced area 80, then, in process block 112, the user equipment 10 displays the WEA 70. Otherwise, if the user equipment 10 determines that it is not located within the geofenced area 80, then, in process block 114, the user equipment 10 does not display or otherwise output the WEA 70.

There may also be difficulties for user equipment 10 that are located outside the geofenced area 80 when receiving the WEA 70, but later enter the geofenced area 80. For example, referring back to FIG. 4, if the user equipment 10 is initially outside the geofenced area 80 (e.g., located in a portion of coverage area 72C that is outside the geofenced area 80) when it receives the WEA 70, then the user equipment 10 may compare its location to the geofenced area 80 indicated in the WEA 7.0, determine that it is not located in the geofenced area 80, and not output the WEA 70. A WHAM 74 may then be sent to the user equipment 10 that requests that the user equipment 10 determine whether it is located within the geofenced area 80 indicated by the WEA 70. However, if user equipment 10 enters the geofenced area 80 but loses cellular service, it may not receive the WHAM 74, and thus not display or otherwise output the WEA 70, despite being in the geofenced area 80 where a user should know about the WEA 70.

The disclosed embodiments enable signaling (e.g., in WHAMs 74) a periodicity for the user equipment 10 to determine whether its location is within the geofenced area 80 indicated in a corresponding WEA 70. FIG. 6 is an example list of extended WHAM signaling, according to embodiments of the present disclosure. In particular, a WHAM may be provided in a tag-length-value (TLV) format, where the WHAM includes a tag indicating a WHAM type, followed by a length of a value of the WHAM, and finally followed by the value itself. The example list illustrates bit positions 8, 7, 6, and 5 within a byte of a WHAM, which corresponding to tags of the WHAM. The 0001 tag 129 corresponds to an active alert identity tuple list 130. That is, the WHAM 74 including the 0001 tag 129 may be indicative of the alert 64 being sent by the alerting authority 62. The 0010 tag 131 corresponds to an active alert identity tuple list—common warning area coordinates 132. The WHAM 74 including the 0010 tag 131 may be indicative of a language (e.g., English, Spanish, and so on) of the alert 64, a language setting of the user equipment 10, and the like. Both the 0001 and the 0010 tags 129, 131 may be defined by the ATIS WEA standards.

The 0011 tag 133 corresponds to a configuration action related to a periodicity configuration 134. The WHAM 74 including the 0011 tag 133 may be indicative of a periodicity for determining whether a location of the user equipment 10 is within the geofenced area 80 (e.g., indicated in a WEA 70). The 0100 tag 135 corresponds to a configuration action related to indicating an alert end 136. The WHAM 74 including the 0100 tag 135 may be indicative of an end to an alert 64. The 0101 tag 137 corresponds to a configuration action related to a lack of service or no-service 138. The WHAM 74 including the 0101 tag 137 may be indicative of a time limit and an action to perform in case of lack of cellular service. The 0110 tag 139 corresponds to a configuration action related to a lack of location or location determination 140. The WHAM 74 including the 0110 tag 139 may be indicative of a time limit and an action to perform in case of lack of location determination. The 1111 tag 141 corresponds to a Commercial Mobile Service Providers (CMSP) defined use. The WHAM 74 including the 1111 tag 141 is reserved for authorized network providers to send public safety alerts and warnings to user equipment 10.

While FIG. 6 illustrates extending WHAM signaling to indicate a periodicity configuration 134 for determining whether a location of the user equipment 10 is within the geofenced area 80 (e.g., the 0011 tag 133), an alert end 136 (e.g., the 0100 tag 135), a lack of service 138 (e.g., the 0101 tag 137), and a lack of location 140 (e.g., the 0110 tag 139), it should be understood that any additional or alternative form of signaling may be used to signal these indications to user equipment 10, such as signaling within a system information block (SIB) sent from the base station 68 to the user equipment 10 to establish a connection or via a dedicated radio resource control (RRC) connection. In particular, the SIB includes SIB types designated for, for example, Earthquake and Tsunami Warning System (ETWS) information (in SIB 10 and SIB 11), Commercial Mobile Alerting System (CMAS) information (in SIB 12), and so on.

FIG. 7 is a TLV code for indicating a periodicity configuration 134 for determining whether a location of the user equipment 10 is within the geofenced area 80, according to embodiments of the present disclosure. The TLV code includes the tag 133 (e.g., 0011), as shown in FIG. 6. The TLV code also includes a length 152 of a value 154 of the TLV code, and the value 154. As illustrated, the length 152 field may be followed by a number of zeroes to, for example, reserve space in the field for future values. The value 154 of the TLV code may include a WEA identifier 156, a periodicity 158, and an end time 160. The WEA identifier 156 may enable the user equipment 10 to identify the WEA 70 for which the periodicity 158 and the end time 160 correspond. The periodicity 158 may indicate how often (e.g., in seconds) the user equipment 10 is to determine whether its location (e.g., using a device-specific location determination technique and/or a GNSS or GPS service) is within the geofenced area 80 (e.g., as indicated in the corresponding WEA 70). The periodicity 158 may be any suitable duration of time to periodically determine whether the location of the user equipment 10 is within the geofenced area 80, such as at least every 1 second, 5 seconds, 10 seconds, 30 seconds, 60 seconds, 90 seconds, 120 seconds, 300 seconds, 600 seconds, 1800 seconds, and so on. The end time 160 may indicate a time for the user equipment 10 to stop determining whether it is located in the geofenced area 80. The end time 160 may be any suitable duration of time to stop determining whether the location of the user equipment 10 is within the geofenced area 80, such as at least 5 seconds, 10 seconds, 30 seconds, 1 minute, 5 minutes, 10 minutes, 30 minutes, 1 hour, 2 hours, 4 hours, 5 hours, 8 hours, 12 hours, 18 hours, 24 hours, and so on. In some embodiments, the end time 160 may be provided in epoch time format. For example, a WHAM 74 that requests that the user equipment 10 determine whether it is located in a geofenced area 80 every 5 minutes for 4 hours may include a periodicity 158 of 5 minutes and an end time 160 of 4 hours. Additionally or alternatively, instead of sending the WEA identifier 156, the periodicity 158, and/or the end time 160 in a signal WHAM 74, the WEA identifier 156, the periodicity 158, and/or the end time 160 may be sent in multiple (e.g., successive in some cases) WHAMs 74.

In some embodiments, the periodicity 158 and/or the end time 160 may be based on one or more parameters set and sent by the alerting authority 62. That is, the periodicity 158 and/or the end time 160 may be based on one or more parameters (e.g., a duration of the alert 64, an indication of when the alert 64 will end) that are part of a CAP message 66 received by the network 67 via the base station 68. As should be understood, the network 67 or the network provider may generate the WHAM 74 with the TLV code for indicating the periodicity configuration 134, and send the WHAM 74 to the user equipment 10 via the base station 68. Upon receiving the WHAM 74, the user equipment 10 may determine whether its location is within the geofenced area 80 according to the periodicity 158, until the end time 160 has elapsed. As such, if the user equipment 10 enters the geofenced area 80 and loses cellular service, but still retains its device-specific location determination technique and/or GNSS or GPS service, then it may determine to see if it is in the geofenced area 80, and display the WEA 70.

Figure 8:
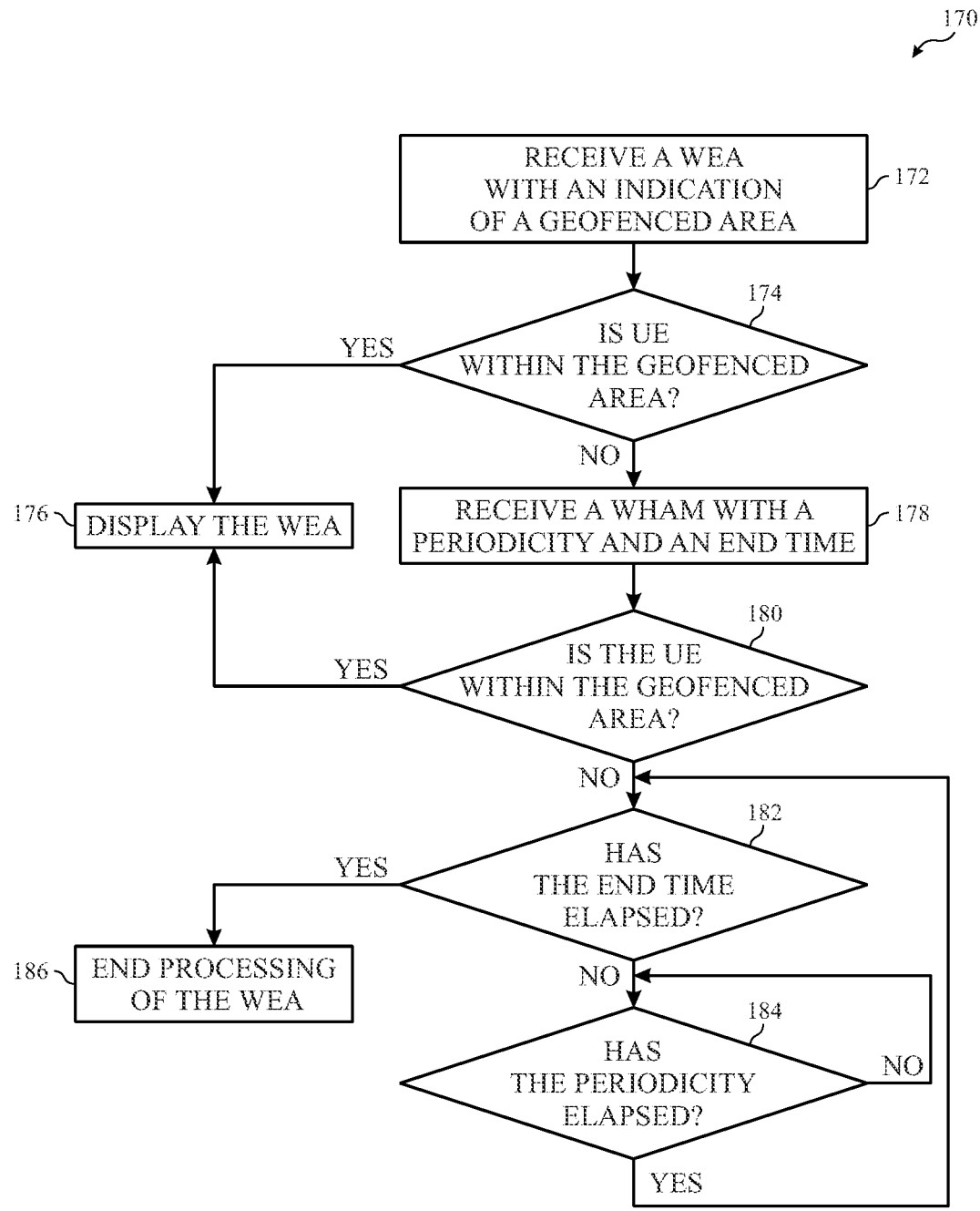
FIG. 8 is a method for periodically determining whether user equipment is located in a geofenced area, according to embodiments of the present disclosure.

With this in mind, FIG. 8 is a method 170 for periodically determining whether the user equipment 10 is located in a geofenced area 80, according to embodiments of the present disclosure. Any suitable device (e.g., a controller) that may control components of the user equipment 10, such as the processor 12, may perform the method 170. In some embodiments, the method 170 may be implemented by executing instructions stored in a tangible, non-transitory, computer-readable medium, such as the memory 14 or storage 16, using the processor 12. For example, the method 170 may be performed at least in part by one or more software components of the user equipment 10, such as an operating system of the user equipment 10, one or more software applications of the user equipment 10, and the like. While the method 170 is described using steps in a specific sequence, it should be understood that the present disclosure contemplates that the described steps may be performed in different sequences than the sequence illustrated, and certain described steps may be skipped or not performed altogether.

In process block 172, the processor 12 receives a WEA 70 with an indication of a geofenced area 80. In decision block 174, the processor 12 determines whether the user equipment 10 is within the geofenced area 80. If so, at process block 176, the processor 12 displays or otherwise outputs the WEA 70. If the processor 12 determines that the user equipment 10 is not within the geofenced area 80, then the processor 12 may not display the WEA 70, and may wait to receive a WHAM 74. In process block 178, the processor 12 receives a WHAM 74 with a periodicity 158 and an end time 160. In some embodiments, the WHAM 74 may include tag 133 (e.g., 0011), length 152, and value 154 format shown in FIG. 7. In any case, the WHAM 74 may include the WEA identifier 156, the periodicity 158, and/or the end time 160 shown in FIG. 7. The WEA identifier 156 may enable the user equipment 10 to identify the WEA 70 for which the periodicity 158 and the end time 160 correspond. The periodicity 158 may indicate how often (e.g., in seconds) the user equipment 10 is to determine whether its location (e.g., using a device-specific location determination technique and/or a GNSS or GPS service) is within the geofenced area 80 (e.g., as indicated in the corresponding WEA 70). The end time 160 may indicate a time for the user equipment 10 to stop determining whether it is located in the geofenced area 80.

In decision block 180, the processor 12 determines whether the user equipment 10 is within the geofenced area 80. If so, the processor 12, in process block 176, displays or otherwise outputs the WEA 70. If the processor 12 determines that the user equipment 10 is not within the geofenced area 80, then, in decision block 182, the processor 12 determines whether the end time 160 provided in the WHAM 74 has elapsed. If not, in decision block 184, the processor 12 determines whether the periodicity 158 provided in the WHAM 74 has elapsed. If not, the repeats decision block 184. If the processor 12 determines that the periodicity 158 has elapsed, then the processor returns to decision block 182 to determine whether the end time 160 has elapsed. If so, the processor 12, in process block 186, ends processing of the WEA 70. That is, the processor 12 may no longer determine whether the user equipment 10 is located in the geofenced area 80. In this manner, even in the case that the user equipment 10 enters the geofenced area 80 and loses cellular service, but still retains using its device-specific location determination technique and/or GNSS or GPS service, the user equipment 10 may continue determining whether it is in the geofenced area 80, and, if so, display the WEA 70.

In addition, in some cases, the network 67 may continue to broadcast the WHAMs 74 via the base station 68, which may be received by the user equipment 10. While the user equipment 10 may be configured to ignore the subsequent WHAMs 74, in some embodiments, the user equipment 10 may choose to process the WHAMs 74 and determine whether it is located in the geofenced area 80 based on receiving a WHAM 74, as opposed to determining whether it is located in the geofenced area 80 based on the periodicity 158. In particular, the network 67 may indicate to the user equipment 10 that the periodicity 158 applies, for example, only when the user equipment 10 does not have cellular service. In some embodiments, this may be a definition as per a contract between the user equipment 10 and the network 67.

Additionally, when an alert 64 associated with a WEA ends, the network 67 may simply stop resending the periodic WEAs 70 and WHAMs 74 associated with the alert 64. However, if the user equipment 10 is located outside the geofenced area 80 when receiving the WEA 70, and the alert 64 ends, but the user equipment 10 later enters the geofenced area 80 after the alert 64 has ended, the user equipment 10 may continue storing the WEA 70 expecting a corresponding WHAM 74, and, in some cases, may continue determining whether it is located in the geofenced area 80 indicated by the WEA 70. This may unnecessarily expend processing and/or networking resources, and sometimes result in a WEA 70 to be output well after the alert 64 associated with the WEA 70 has ended.

Figure 9:
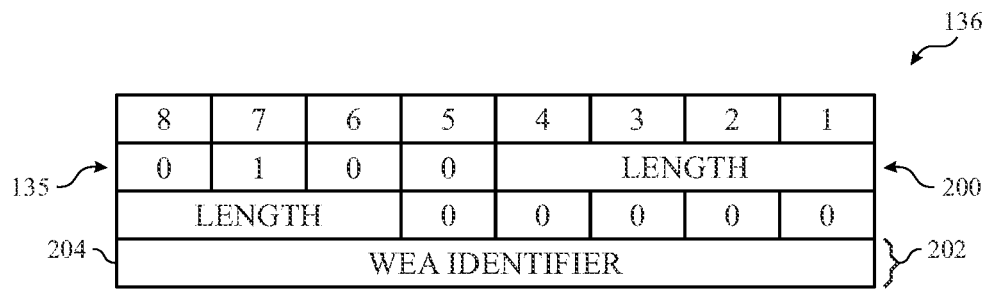
FIG. 9 is a TLV code for indicating an alert end, according to embodiments of the present disclosure.

FIG. 9 is a TLV code for indicating an alert end 136, according to embodiments of the present disclosure. The TLV code includes the tag 135 (e.g., 0100), as shown in FIG. 6. The TLV code also includes a length 200 of a value 202 of the TLV code, and the value 202. The value 202 of the TLV code may include a WEA identifier 204, which may enable the user equipment 10 to identify the WEA 70 for which the corresponding alert 64 has ended. In some embodiments, the WHAM 74 indicating the alert end 136 may be based on one or more parameters set and sent by the alerting authority 62. That is, the WHAM 74 indicating the alert end 136 may be based on one or more parameters (e.g., a duration of the alert 64, an indication of when the alert 64 will end) that are part of a CAP message 66 received by the network 67 via the base station 68. As should be understood, the network 67 or the network provider may generate the WHAM 74 with the TLV code for indicating the alert end 136, and send the WHAM 74 to the user equipment 10 via the base station 68. Upon receiving the WHAM 74, the user equipment 10 may stop processing the WEA 70 (e.g., stop determining whether its location is within the geofenced area 80). As such, the user equipment 10 may avoid continued storage of a WEA 70 corresponding to the alert 64 in expectation of a corresponding WHAM 74, and continued determinations to see if it is located in the geofenced area 80 indicated by the WEA 70. Thus, processing and/or networking resources may be conserved, and outputting a WEA 70 well after the alert 64 associated with the WEA 70 has ended may be avoided.

While FIG. 9 illustrates a WHAM 74 indicating an alert end 136, it should be understood that any additional or alternative form of signaling may be used to signal an end of an alert 64 to user equipment 10, such as signaling within a system information block (SIB) sent from the base station 68 to the user equipment 10 to establish a connection. In particular, an indication to end an alert 64 may be provided in a SIB, along with the WEA identifier 204 (e.g., a message identifier or serial number corresponding to the WEA 70). Moreover, in additional or alternative embodiments, an indication of a duration of the alert 64 may be sent via, for example, a WEA 70. In such embodiments, the user equipment 10 may then determine when the alert 64 is over, rather than receiving an indication from the WHAM 74 indicating the alert end 136.

Figure 10:
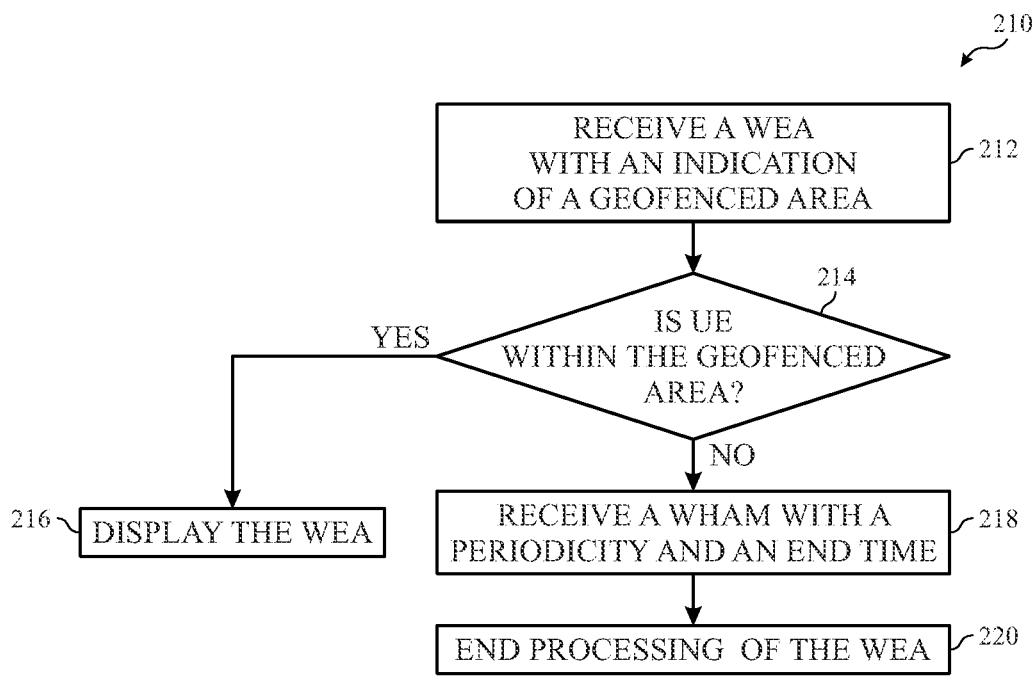
FIG. 10 is a method for ending processing of a WEA, according to embodiments of the present disclosure.

With this in mind, FIG. 10 is a method 210 for ending processing of a WEA 70, according to embodiments of the present disclosure. Any suitable device (e.g., a controller) that may control components of the user equipment 10, such as the processor 12, may perform the method 210. In some embodiments, the method 210 may be implemented by executing instructions stored in a tangible, non-transitory, computer-readable medium, such as the memory 14 or storage 16, using the processor 12. For example, the method 210 may be performed at least in part by one or more software components of the user equipment 10, such as an operating system of the user equipment 10, one or more software applications of the user equipment 10, and the like. While the method 210 is described using steps in a specific sequence, it should be understood that the present disclosure contemplates that the described steps may be performed in different sequences than the sequence illustrated, and certain described steps may be skipped or not performed altogether.

In process block 212, the processor 12 receives a WEA 70 with an indication of a geofenced area 80. In decision block 214, the processor 12 determines whether the user equipment 10 is within the geofenced area 80. If so, at process block 216, the processor 12 displays or otherwise outputs the WEA 70. If the processor 12 determines that the user equipment 10 is not within the geofenced area 80, then the processor 12 may not display the WEA 70, and may wait to receive a WHAM 74. In process block 218, the processor 12 receives a WHAM 74 with an alert end indication 136. In some embodiments, the WHAM 74 may include tag 135 (e.g., 0100), length 200, and value 202 format shown in FIG. 9. In any case, the WHAM 74 may include the WEA identifier 156 that enables the user equipment 10 to identify the WEA 70 for which the corresponding alert 64 has ended. Accordingly, in process block 220, the processor 12 ends processing of the WEA 70. That is, the processor 12 may no longer determine whether the user equipment 10 is located in the geofenced area 80. In this manner, the user equipment 10 may avoid continued storage of a WEA 70 corresponding to the alert 64 in expectation of a corresponding WHAM 74, and continued determinations to see if it is located in the geofenced area 80 indicated by the WEA 70. Thus, processing and/or networking resources may be conserved, and outputting a WEA 70 well after the alert 64 associated with the WEA 70 has ended may be avoided.

Figure 11:
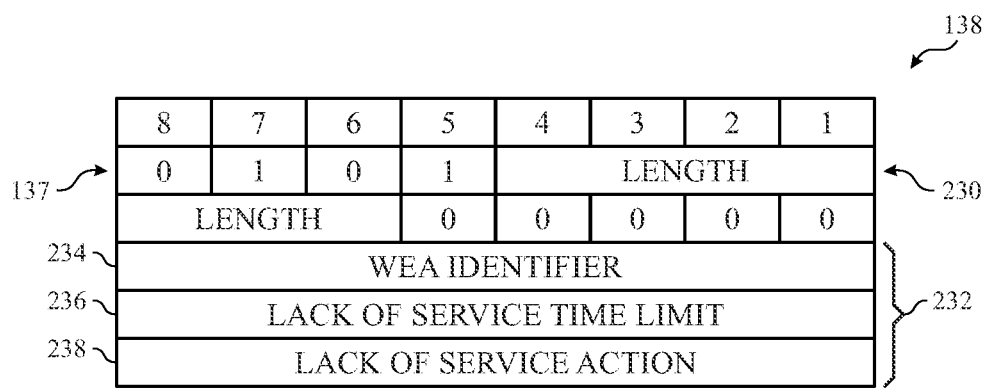
FIG. 11 is a TLV code for indicating a lack of service, according to embodiments of the present disclosure.

Furthermore, if the user equipment 10 enters the geofenced area 80, but loses cellular service, it may not receive a WHAM 74, and thus not display or otherwise output the WEA 70, despite being in the geofenced area 80 where a user should know about the WEA 70. FIG. 11 is a TLV code for indicating a lack of service 138, according to embodiments of the present disclosure. The TLV code includes the tag 137 (e.g., 0101), as shown in FIG. 6. The TLV code also includes a length 230 of a value 232 of the TLV code, and the value 232. The value 232 of the TLV code may include a WEA identifier 234, a lack of service time limit 236, and a lack of service action 238. The WEA identifier 234 may enable the user equipment 10 to identify the WEA 70 for which the lack of service time limit 236 and the lack of service action 238 correspond. The lack of service action 238 includes an action for the user equipment 10 to perform after it has been without cellular service for the lack of service time limit 236. In some embodiments, the lack of service action 238 may include displaying or otherwise outputting the WEA 70, or an action defined by implementation of the user equipment 10. For example, if the lack of service action 238 is a first value (e.g., a logic low or 0 value), then the user equipment 10 may display the WEA 70 upon being without cellular service for the lack of service time limit 236. If the lack of service action 238 is a second value (e.g., a logic high or 1 value), then the user equipment 10 may perform an action defined by implementation of the user equipment 10. Additionally or alternatively, instead of sending the WEA identifier 156, the lack of service time limit 236, and/or the lack of service action 238 in a signal WHAM 74, the WEA identifier 156, the lack of service time limit 236, and/or the lack of service action 238 may be sent in multiple (e.g., successive in some cases) WHAMs 74.

In some embodiments, the lack of service time limit 236 may be based on one or more parameters set and sent by the alerting authority 62 or the network 67. For example, the lack of service time limit 236 may be based on a maximum wait time indicated in a system information block (SIB) sent from the base station 68 to the user equipment 10 to establish a connection. The lack of service time limit 236 may be expressed in seconds, and include any suitable time to wait for cellular service to be restored to the user equipment 10 before the lack of service action 238 is performed, such as at least 10 seconds, 30 seconds, 45 seconds, 60 seconds, 90 seconds, 120 seconds, 255 seconds, and so on. In this manner, the user equipment 10 may display the WEA 70, or perform any other suitable action, even if it is without cellular service.

Figure 12:
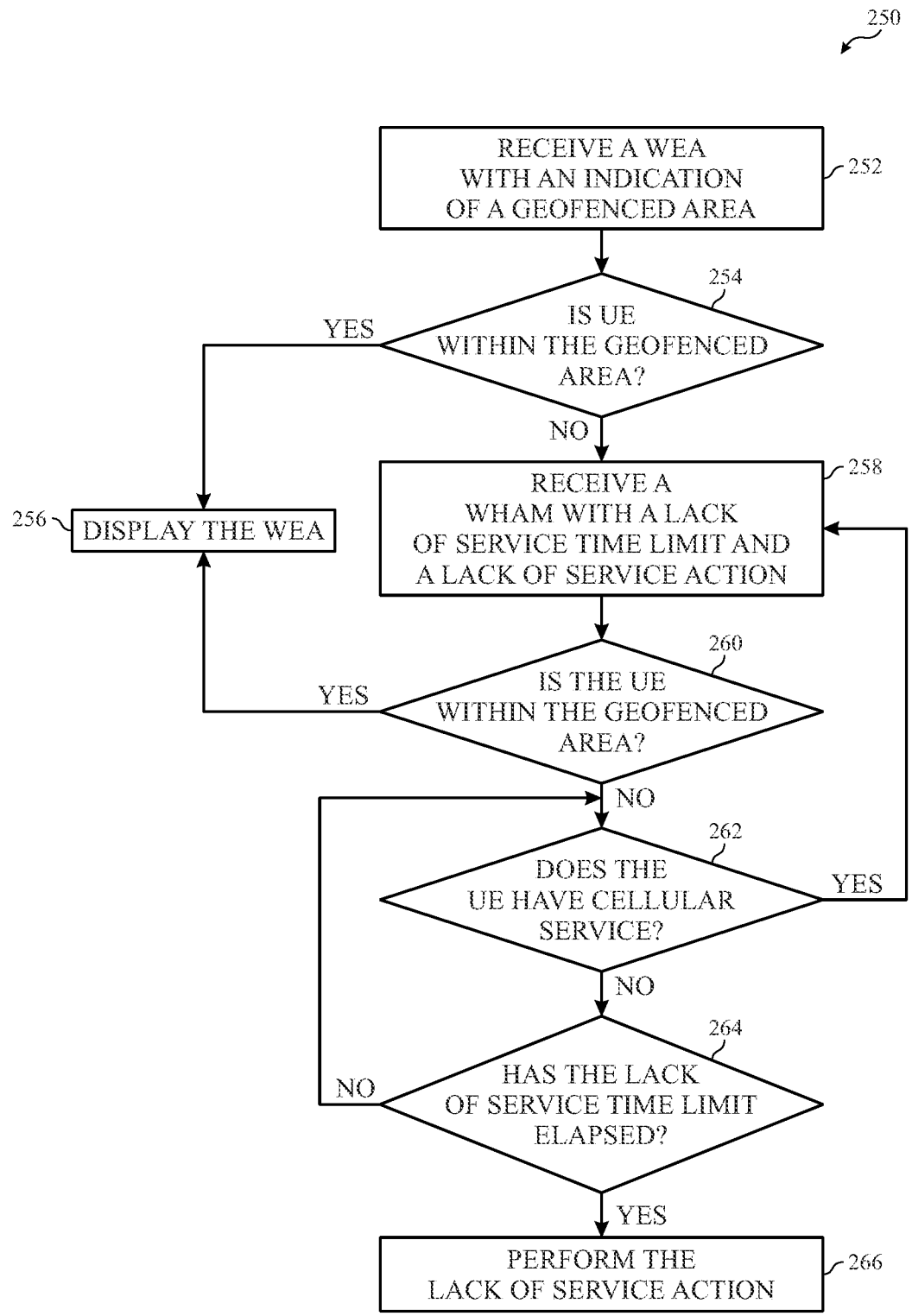
FIG. 12 is a method for performing a lack of service action after being without cellular service for a lack of service time limit, according to embodiments of the present disclosure.

With this in mind, FIG. 12 is a method 250 for performing the lack of service action 238 after being without cellular service for the lack of service time limit 236, according to embodiments of the present disclosure. Any suitable device (e.g., a controller) that may control components of the user equipment 10, such as the processor 12, may perform the method 250. In some embodiments, the method 250 may be implemented by executing instructions stored in a tangible, non-transitory, computer-readable medium, such as the memory 14 or storage 16, using the processor 12. For example, the method 250 may be performed at least in part by one or more software components of the user equipment 10, such as an operating system of the user equipment 10, one or more software applications of the user equipment 10, and the like. While the method 250 is described using steps in a specific sequence, it should be understood that the present disclosure contemplates that the described steps may be performed in different sequences than the sequence illustrated, and certain described steps may be skipped or not performed altogether.

In process block 252, the processor 12 receives a WEA 70 with an indication of a geofenced area 80. In decision block 254, the processor 12 determines whether the user equipment 10 is within the geofenced area 80. If so, at process block 256, the processor 12 displays or otherwise outputs the WEA 70. If the processor 12 determines that the user equipment 10 is not within the geofenced area 80, then the processor 12 may not display the WEA 70, and may wait to receive a WHAM 74. In process block 258, the processor 12 receives a WHAM 74 with a lack of service time limit 236 and a lack of service action 238. In some embodiments, the WHAM 74 may include tag 137 (e.g., 0101), length 230, and value 232 format shown in FIG. 11. In any case, the WHAM 74 may include the WEA identifier 234, the lack of service time limit 236, and/or the lack of service action 238 shown in FIG. 11. The WEA identifier 156 may enable the user equipment 10 to identify the WEA 70 for which the lack of service time limit 236 and the lack of service action 238 correspond. The lack of service action 238 includes an action for the user equipment 10 to perform after it has been without cellular service for the lack of service time limit 236.

In decision block 260, the processor 12 determines whether the user equipment 10 is within the geofenced area 80. If so, the processor 12, in process block 256, displays or otherwise outputs the WEA 70. If the processor 12 determines that the user equipment 10 is not within the geofenced area 80, then, in decision block 262, the processor 12 determines whether the user equipment 10 has cellular service. That is, the processor 12 may determine whether it may send and/or receive signals using its transmitter 52 and/or receiver 54 over a cellular network 67 (e.g., via the base station 68). If so, then the processor 12 may not display the WEA 70, and may wait to receive a WHAM 74, returning to process block 258 to receive another WHAM 74 with a lack of service time limit 236 and a lack of service action 238. If the processor 12 determines that the user equipment 10 does not have cellular service, then, in decision block 264, the processor 12 determines whether the lack of service time limit 236 has elapsed. If not, the processor 12 returns to decision block 262 to determine whether the user equipment 10 has cellular service. If the processor 12 determines that the lack of service time limit 236 has elapsed, then, in process block 266, the processor 12 performs the lack of service action 238. For example, the lack of service action 238 may include displaying or otherwise outputting the WEA 70, or an action defined by implementation of the user equipment 10. In this manner, the user equipment 10 may display the WEA 70, or perform any other suitable action, even if it is without cellular service.

Figure 13:
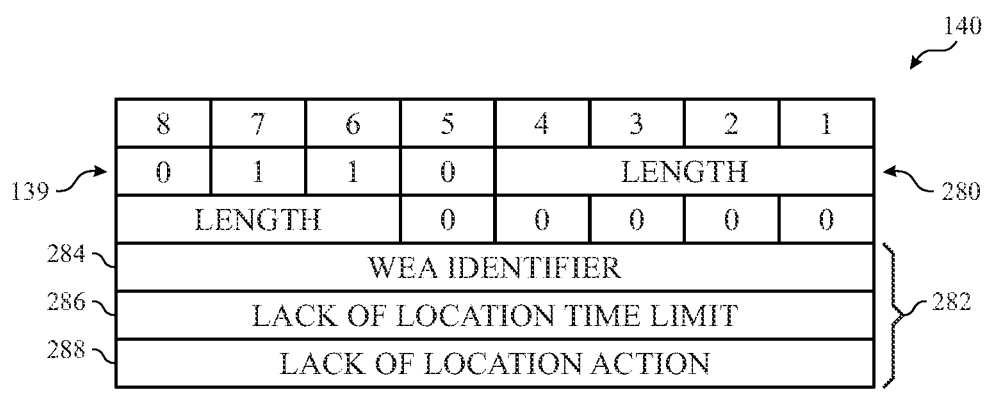
FIG. 13 is a TLV code for indicating a lack of location, according to embodiments of the present disclosure.

Similarly, if the user equipment 10 enters the geofenced area 80, but loses the ability to determine its location and/or its cellular service, (e.g., a device-specific location determination technique and/or a GNSS or GPS service, is not operational), it may receive a WHAM 74, but not be able to determine whether it is located in the geofenced area 80, and thus not display or otherwise output the WEA 70, despite being in the geofenced area 80 where a user should know about the WEA 70. FIG. 13 is a TLV code for indicating a lack of location 140, according to embodiments of the present disclosure. The TLV code includes the tag 139 (e.g., 0110), as shown in FIG. 6. The TLV code also includes a length 280 of a value 282 of the TLV code, and the value 282. The value 282 of the TLV code may include a WEA identifier 284, a lack of location time limit 286, and a lack of location action 288. The WEA identifier 284 may enable the user equipment 10 to identify the WEA 70 for which the lack of location time limit 286 and the lack of location action 288 correspond. The lack of location action 288 includes an action for the user equipment 10 to perform after it has been unable to determine its location for the lack of location time limit 286. In some embodiments, the lack of location action 288 may include displaying or otherwise outputting the WEA 70, or an action defined by implementation of the user equipment 10. For example, like the lack of service action 238, if the lack of location action 288 is a first value (e.g., a logic low or 0 value), then the user equipment 10 may display the WEA 70 upon being unable to determine its location for the lack of location time limit 286. If the lack of location action 288 is a second value (e.g., a logic high or 1 value), then the user equipment 10 may perform an action defined by implementation of the user equipment 10. Additionally or alternatively, instead of sending the WEA identifier 156, the lack of location time limit 286, and/or the lack of location action 288 in a signal WHAM 74, the WEA identifier 156, the lack of location time limit 286, and/or the lack of location action 288 may be sent in multiple (e.g., successive in some cases) WHAMs 74.

Like the lack of service time limit 236, the lack of location time limit 286 may be based on one or more parameters set and sent by the alerting authority 62 or the network 67. For example, the lack of location time limit 286 may be based on a maximum wait time indicated in a system information block (SIB) sent from the base station 68 to the user equipment 10 to establish a connection. In some cases, the MAX WAIT TIME parameter, as defined in ATIS standards specification 0700041 section 5.2.8, which is broadcasted with geofencing coordinates, may be used as the lack of location time limit 286. The lack of location time limit 286 may be expressed in seconds, and include any suitable time to wait for cellular service to be restored to the user equipment 10 before the lack of location action 288 is performed, such as at least 10 seconds, 30 seconds, 45 seconds, 60 seconds, 90 seconds, 120 seconds, 255 seconds, and so on. In this manner, the user equipment 10 may display the WEA 70, or perform any other suitable action, even if it is unable to determine its location.

Figure 14:
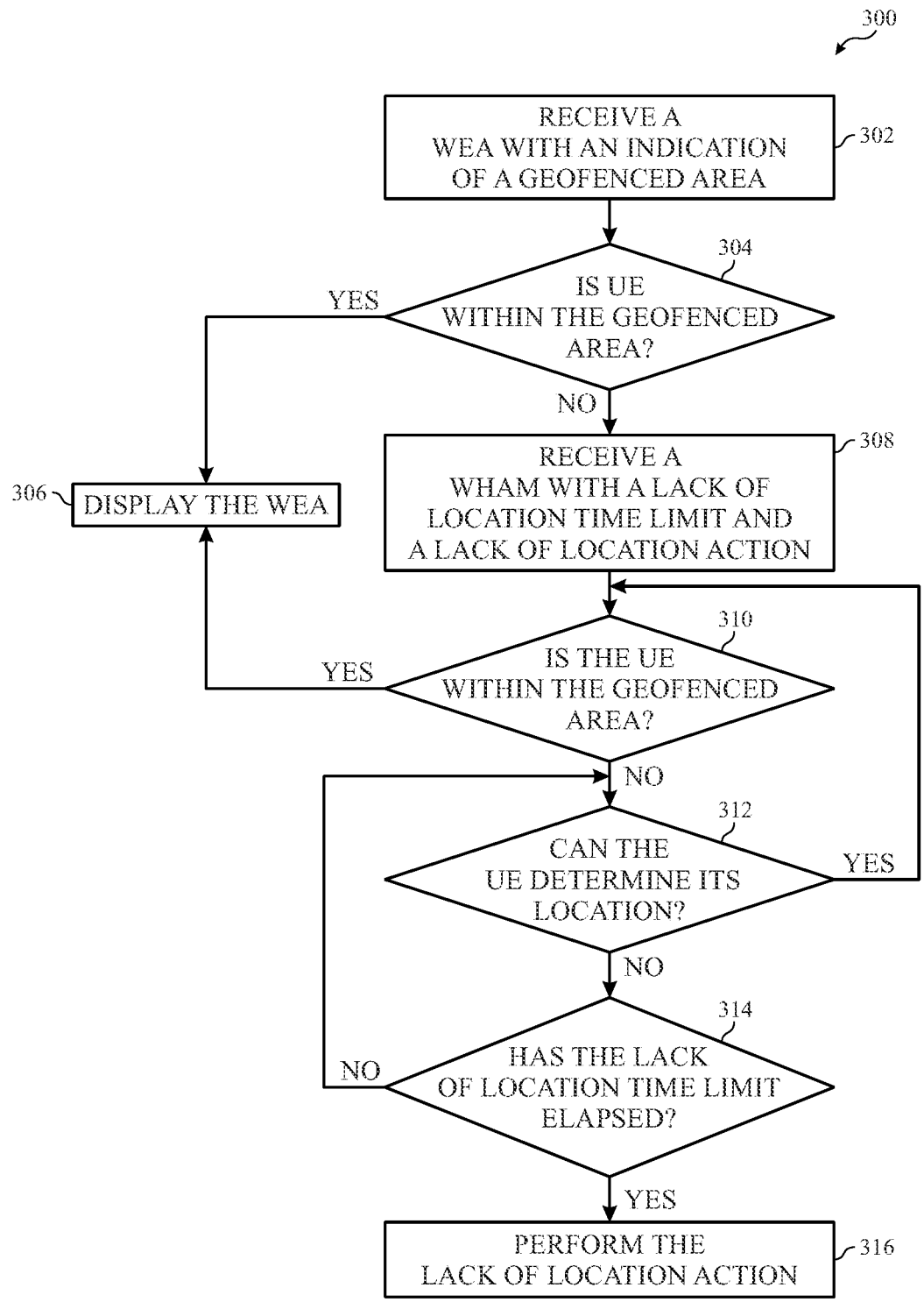
FIG. 14 is a method for performing a lack of location action after being unable to determine a location of user equipment for a lack of location time limit, according to embodiments of the present disclosure.

With this in mind, FIG. 14 is a method 300 for performing the lack of location action 288 after being unable to determine a location of the user equipment 10 for the lack of location time limit 286, according to embodiments of the present disclosure. Any suitable device (e.g., a controller) that may control components of the user equipment 10, such as the processor 12, may perform the method 300. In some embodiments, the method 300 may be implemented by executing instructions stored in a tangible, non-transitory, computer-readable medium, such as the memory 14 or storage 16, using the processor 12. For example, the method 300 may be performed at least in part by one or more software components of the user equipment 10, such as an operating system of the user equipment 10, one or more software applications of the user equipment 10, and the like. While the method 300 is described using steps in a specific sequence, it should be understood that the present disclosure contemplates that the described steps may be performed in different sequences than the sequence illustrated, and certain described steps may be skipped or not performed altogether.

In process block 302, the processor 12 receives a WEA 70 with an indication of a geofenced area 80. In decision block 304, the processor 12 determines whether the user equipment 10 is within the geofenced area 80. If so, at process block 306, the processor 12 displays or otherwise outputs the WEA 70. If the processor 12 determines that the user equipment 10 is not within the geofenced area 80, then the processor 12 may not display the WEA 70, and may wait to receive a WHAM 74. In process block 308, the processor 12 receives a WHAM 74 with a lack of location time limit 286 and a lack of location action 288. In some embodiments, the WHAM 74 may include tag 139 (e.g., 0110), length 280, and value 282 format shown in FIG. 13. In any case, the WHAM 74 may include the WEA identifier 284, the lack of location time limit 286, and/or the lack of location action 288 shown in FIG. 13. The WEA identifier 156 may enable the user equipment 10 to identify the WEA 70 for which the lack of location time limit 286 and the lack of location action 288 correspond. The WEA identifier 156 may be defined as per ATIS 0700041 specification section 5.1.6: Active alert identity tuple. The lack of location action 288 includes an action for the user equipment 10 to perform after it has been unable to determine its location for the lack of location time limit 286.

In decision block 310, the processor 12 determines whether the user equipment 10 is within the geofenced area 80. If so, the processor 12, in process block 306, displays or otherwise outputs the WEA 70. If the processor 12 determines that the user equipment 10 is not within the geofenced area 80, then, in decision block 312, the processor 12 determines whether the user equipment 10 is able to determine its location. That is, the processor 12 may determine whether its device-specific location determination technique and/or GNSS or GPS service is operational. If so, then the processor 12 may return to decision block 312 to determine whether the user equipment 10 is within the geofenced area 80. If the processor 12 determines that the user equipment 10 is unable to determine its location, then, in decision block 314, the processor 12 determines whether the lack of action time limit 286 has elapsed. If not, the processor 12 returns to decision block 312 to determine whether the user equipment 10 is within the geofenced area 80. If the processor 12 determines that the lack of action time limit 286 has elapsed, then, in process block 316, the processor 12 performs the lack of location action 288. For example, the lack of location action 288 may include displaying or otherwise outputting the WEA 70, or an action defined by implementation of the user equipment 10. In this manner, the user equipment 10 may display the WEA 70, or perform any other suitable action, even if it cannot determine its location.

While the disclosed embodiment include providing certain information (e.g., indications of the geofenced area 80, duration of an alert 64, and so on) in a WHAM 74, additional information that may be relevant to the alert 64 may also be provided (e.g., in the corresponding WEA 70 and/or the WHAM 74). In particular, the additional information may be received via a CAP message 66 from the alerting authority 62 by the network 67 via the base station 68. For instance, the additional information may include CAP information elements like a source of the alert 64 (e.g., the United States Geological Survey), a category of the alert 64 (e.g., geological), an event description of the alert 64 (e.g., earthquake warning), a response type of the alert 64 (e.g., asking users to take shelter), an urgency of the alert 64 (e.g., immediate), a severity of the alert 64 (e.g., severe), a certainty of the alert 64 (e.g., observed), and so on.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method performed by user equipment, comprising:
receiving, via a receiver of the user equipment, a wireless emergency alert when the user equipment is outside of a geofenced area;
receiving, via the receiver of the user equipment, a plurality of action messages related to the wireless emergency alert, the plurality of action messages comprising a lack of service time limit and a lack of service action; and
after receiving the wireless emergency alert and the plurality of action messages and after determining that the user equipment does not have cellular service based on the user equipment being unable to establish a connection with a base station,
performing the lack of service action based on the user equipment being unable to establish the connection with the base station for a duration of time that exceeds the lack of service time limit.

2. The method of claim 1, wherein the plurality of action messages comprises a wireless emergency alert identifier corresponding to the wireless emergency alert.

3. The method of claim 1, wherein the plurality of action messages comprises a first field comprising a tag indicating a type of the plurality of action messages, a second field comprising a length of a value, and a third field comprising the value.

4. The method of claim 3, wherein the value of the plurality of action messages comprises a wireless emergency alert identifier, the lack of service time limit, and the lack of service action.

5. The method of claim 1, comprising receiving a system information block, via the receiver, the system information block comprising a maximum wait time, and the lack of service time limit comprising the maximum wait time.

6. The method of claim 1, wherein the lack of service action comprises displaying the wireless emergency alert.

7. The method of claim 1, wherein the lack of service action is based on an implementation of the user equipment.

8. The method of claim 1, wherein the plurality of action messages conforms to an Alliance for Telecommunications Industry Solutions (ATIS) Wireless Emergency Alert (WEA) standard.

9. A base station, comprising:
a receiver; and
a transmitter; and
at least one processor configured to
receive, via the receiver, an alert message from an alert authority, the alert message comprising an indication of a geofenced area,
send, using the transmitter, a wireless emergency alert to a user equipment, wherein the wireless emergency alert causes the user equipment to determine whether to display the wireless emergency alert based on whether the user equipment is in the geofenced area, and
send, using the transmitter, an action message associated with the wireless emergency alert, wherein the action message comprises a lack of service time limit and a lack of service action instructing the user equipment to present the wireless emergency alert when the user equipment loses cellular service for a duration of time that exceeds the lack of service time limit.

10. The base station of claim 9, wherein the indication of the geofenced area comprises latitude and longitude coordinates.

11. The base station of claim 9, wherein the at least one processor is configured to determine whether a coverage area of the base station is within the geofenced area.

12. The base station of claim 9, wherein the alert authority comprises one or more computing devices of an authority designated to alert people within the geofenced area.

13. The base station of claim 9, wherein the wireless emergency alert conforms to an Alliance for Telecommunications Industry Solutions (ATIS) Wireless Emergency Alert (WEA) standard.

14. The base station of claim 9, wherein the action message comprises a wireless emergency alert identifier corresponding to the wireless emergency alert.

15. The base station of claim 9, wherein the at least one processor is configured to receive, via the receiver, a system information block comprising a maximum wait time, and the lack of service time limit comprising the maximum wait time.

16. A non-transitory computer-readable medium, comprising computer-executable instructions that, when executed by one or more processors of user equipment, cause the one or more processors to:
receive, via a receiver of the user equipment, one or more action messages associated with a wireless emergency alert, the one or more action messages comprising a lack of service time limit;
determine that the user equipment does not have cellular service based on the user equipment not establishing a connection with a base station; and
display, via a display of the user equipment, the wireless emergency alert based on the user equipment not establishing the connection with the base station for a duration of time that exceeds the lack of service time limit.

17. The non-transitory computer-readable medium of claim 16, wherein the one or more action messages conforms to an Alliance for Telecommunications Industry Solutions (ATIS) Wireless Emergency Alert (WEA) standard.

18. The non-transitory computer-readable medium of claim 16, wherein the one or more action messages comprise a wireless emergency alert identifier corresponding to the wireless emergency alert.

19. The non-transitory computer-readable medium of claim 16, wherein the one or more action messages comprise a first field comprising a tag indicating a type of the one or more action messages, a second field comprising a length of a value, and a third field comprising the value.

20. The non-transitory computer-readable medium of claim 19, wherein the value of the one or more action messages comprises a wireless emergency alert identifier.

\* \* \* \* \*